(12) United States Patent
Berger et al.

(10) Patent No.: US 10,992,970 B2
(45) Date of Patent: Apr. 27, 2021

(54) METHOD FOR COMMUNICATING AN IMMERSIVE VIDEO

(71) Applicant: SAGEMCOM BROADBAND SAS, Rueil-Malmaison (FR)

(72) Inventors: Jèrôme Berger, Rueil-Malmaison (FR); Thomas Landais, Rueil-Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 36 days.

(21) Appl. No.: 16/613,144

(22) PCT Filed: May 17, 2018

(86) PCT No.: PCT/EP2018/062873
§ 371 (c)(1),
(2) Date: Nov. 13, 2019

(87) PCT Pub. No.: WO2018/211000
PCT Pub. Date: Nov. 22, 2018

(65) Prior Publication Data
US 2020/0396493 A1 Dec. 17, 2020

(30) Foreign Application Priority Data
May 19, 2017 (FR) ..................................... 1754465

(51) Int. Cl.
*H04N 21/2343* (2011.01)
*H04N 13/167* (2018.01)
(Continued)

(52) U.S. Cl.
CPC ..... *H04N 21/23439* (2013.01); *H04N 13/167* (2018.05); *H04N 13/194* (2018.05);
(Continued)

(58) Field of Classification Search
CPC ....... H04N 21/23439; H04N 21/21805; H04N 21/437; H04N 21/44218; H04N 21/816;
(Continued)

(56) References Cited

U.S. PATENT DOCUMENTS

2004/0125148 A1 7/2004 Pea et al.
2007/0003211 A1* 1/2007 Gregory ......... H04N 21/234381
386/264

(Continued)

FOREIGN PATENT DOCUMENTS

FR 2976149 A1 12/2012
FR 2989790 A1 10/2013
WO 2013/079420 A1 6/2013

OTHER PUBLICATIONS

Jul. 25, 2018 International Search Report issued in International Patent Application No. PCT/EP2018/062873.
(Continued)

*Primary Examiner* — Alexander Gee
(74) *Attorney, Agent, or Firm* — Oliff PLC; R. Brian Drozd

(57) ABSTRACT

In order to reduce the large volume of data transmitted over a network, immersive videos are frequently represented by a multiple versions, each version being optimised in terms of quality for a point of view on the immersive video, the immersive video parts not representing the point of view for which the version was optimised being of lower quality. In this context, when a user using suitable viewing equipment views the immersive video, he must change version whenever he changes point of view. Each version is generally stored on a server relatively distant from the viewing equipment, which may give rise to latencies in the reception of a new version following a change of point of view. This latency time is reduced by allowing a node in the interme-
(Continued)

diate network between the server and the viewing equipment to transmit each version to the equipment in place of the server.

17 Claims, 3 Drawing Sheets

(51) Int. Cl.
*H04N 13/194* (2018.01)
*H04N 13/366* (2018.01)
*H04N 21/218* (2011.01)
*H04N 21/437* (2011.01)
*H04N 21/81* (2011.01)
*H04N 13/332* (2018.01)
*H04N 13/344* (2018.01)
*H04N 13/383* (2018.01)
*H04N 5/232* (2006.01)
*H04N 21/2662* (2011.01)
*H04N 21/472* (2011.01)
*H04N 21/4728* (2011.01)
*H04N 21/442* (2011.01)

(52) U.S. Cl.
CPC ..... *H04N 13/366* (2018.05); *H04N 21/21805* (2013.01); *H04N 21/437* (2013.01); *H04N 21/44218* (2013.01); *H04N 21/816* (2013.01); *H04N 13/332* (2018.05)

(58) Field of Classification Search
CPC ........... H04N 21/2662; H04N 21/4728; H04N 13/167; H04N 13/194; H04N 13/366; H04N 13/332
See application file for complete search history.

(56) References Cited

U.S. PATENT DOCUMENTS

| | | | |
|---|---|---|---|
| 2013/0141523 A1* | 6/2013 | Banta | H04N 21/47202 348/36 |
| 2015/0249813 A1* | 9/2015 | Cole | H04N 21/21805 386/241 |
| 2015/0326632 A1* | 11/2015 | Lammers | H04N 21/8358 709/231 |
| 2017/0223395 A1* | 8/2017 | Elliot | H04N 21/234345 |
| 2017/0374411 A1* | 12/2017 | Lederer | H04N 21/462 |
| 2018/0103199 A1* | 4/2018 | Hendry | H04N 21/2343 |
| 2018/0164593 A1* | 6/2018 | Van Der Auwera | H04N 21/816 |
| 2018/0302557 A1* | 10/2018 | Rogers | H04N 19/146 |

OTHER PUBLICATIONS

Jul. 25, 2018 Written Opinion issued in International Patent Application No. PCT/EP2018/062873.

* cited by examiner

METHOD FOR COMMUNICATING AN IMMERSIVE VIDEO

The present invention relates to a method for communicating immersive videos, and a system and devices able to implement the method.

The past years have seen an appearance of a plurality of methods for viewing images and videos. Thus, whereas until the years 2000 there were merely two-dimensional (2D) images, stereoscopic videos, three-dimensional (3D) videos and immersive videos depicting the same scene taken at 360 degrees have appeared.

At the present time, systems for broadcasting immersive videos no longer require the use of dedicated rooms comprising a 360 degree screen and a plurality of image-projection devices each projecting a point of view of an immersive video. It is in fact possible now to obtain a system for broadcasting immersive videos using glasses, referred to as immersive glasses or immersive 3D glasses, comprising an integrated image-display device.

This simpler method of use makes it possible to envisage that systems for broadcasting immersive videos will be within the reach of everyone. Thus, in future, users will be able to view immersive videos in their dwelling. These immersive videos will be supplied by operators and transmitted through communication networks such as the internet, just like what takes place currently with the broadcasting of 2D videos by internet.

FIG. 1 illustrates schematically an example of a system for broadcasting immersive videos 1. In this system, a user 12 wears a pair of immersive glasses 13. This pair of immersive glasses 13 comprises a processing module 131 and an image-viewing module, not shown. The image-viewing module comprises for example a screen facing each eye of the user 12. The image-viewing module enables the user to view a 360 degree video represented by a ring 10 in FIG. 1. In this system, the immersive video has been received by the processing module 131 by means of a communication network, and then decoded by the processing module 131 before display thereof on the image-viewing module.

During display, the immersive-video broadcasting system 1 defines a simple geometric shape (such as a ring, a sphere, a dome or a cube) to which the immersive video is applied. However, the user 12 sees only part of the immersive video limited by his field of view. Thus, in FIG. 1, the user 12 sees only a part of the immersive video facing him and delimited by broken lines 11A and 11B. The rest of the immersive video is used only if the user 12 changes point of view on the video.

In addition to offering a point of view to the user that is much wider than a conventional HD (high definition: 1920× 1080 pixels) video, an immersive video generally has a spatial resolution and temporal resolution appreciably superior to a conventional HD video. Such characteristics involve a very high bitrate, which may be difficult for a network to support.

In known immersive-video broadcasting systems, a server generates a plurality of versions of the same immersive video. Each version corresponds to a point of view of the video, and the set of versions covers all the possible points of view of the immersive video. In each version, a part of the video corresponding to a field of view of a user (i.e. what the user sees) is compressed in optimum quality. The parts of the video not corresponding to the field of view of the user (i.e. what the user does not see since it is outside his field of view) are compressed in a lower quality. When the user focuses on a point of view, the version corresponding to his point of view is transmitted to him by the server. When the user changes point of view, he requests the server to transmit to him a new version corresponding to his new point of view. While awaiting reception of this new version, he uses the compressed parts in an inferior quality of the previous version for displaying to the user images corresponding to the new point of view.

The document w16189, *WD on ISO/IEC 23000-20 Omnidirectional Media Application Format*, Byeongdoo Choi, Ye-Kui Wang, Miska M Hannuksela describes a set of 3D geometric shapes to which immersive videos can be applied. One of these 3D geometric shapes is a truncated pyramid as described in FIG. 2.

FIG. 2 illustrates schematically a 3D geometric shape 2 to which an immersive video can be applied.

The 3D geometric shape 2 comprises a square base 21, lateral trapezoidal faces 22, 23, 24 and 25 and a square face 20 opposite and parallel to the square base 21. The square base 21 has a surface area greater than the face 20. The part of the immersive video corresponding to the field of view of the user is applied to the square base 21. The parts of the immersive video outside the field of view of the user but close thereto are applied to the lateral trapezoidal faces. The parts of the immersive video behind the user are applied to the square face 20. Consequently the part of the immersive video seen by the user has high resolution, and the parts situated outside the field of view of the user have a resolution decreasing according to a distance to the limits of the field of view of the user up to a minimum resolution. When this immersive video is encoded, the part of the immersive video intended to be applied to the square base 21 is slightly compressed, the part of the immersive video intended to be applied to the square face 20 is highly compressed and the parts of the immersive video intended to be applied to the lateral trapezoidal faces 23 to 25 have an intermediate degree of compression that can be adapted according to the distance to the square base 21. Thus the further the user is away from his initial point of view, the more the appearance of the immersive video is degraded.

It will therefore be noted that, in this existing system, when a user changes point of view, he does not obtain an immersive video of optimum quality immediately, but must wait until the server transmits to him a new version of the immersive video corresponding to his new point of view. Such latency may disconcert a user.

It is desirable to overcome these drawbacks of the prior art. It is in particular desirable to provide a solution where, when the point of view changes, the latency for obtaining a new version of the immersive video is very small, or even zero.

It is also desirable to provide a solution that is simple to implement at low cost.

According to a first aspect of the present invention, the present invention relates to a method for communicating an immersive video between a server and viewing equipment connected together by a communication link comprising an intermediate network node, said immersive video being stored on the server in the form of a plurality of versions, each version corresponds to a different point of view on the immersive video and the set of versions covers a set of possible points of view on the immersive video, each version has maximum quality in a region of the immersive video corresponding to the field of view of a user viewing the immersive video from said point of view, and a quality inferior to the maximum quality outside said region, the server storing at least one representation for each version in the form of a compressed binary video stream comprising a series of groups of images of predefined duration decodable independently, each representation of the same version having a different bitrate. The method is executed at predetermined regular intervals or following a change of point of view of the user and comprises: obtaining a description of a point of view of the user; transmitting, in the direction of the server, a first request with a view to receiving a representation corresponding to said point of view, referred to as the selected representation, determined from a description of each representation and from the description of the point of view of the user; receiving, from the intermediate network node, the representation selected in response to the first request, the intermediate network node continuously receiving at least one subset of representations of the immersive video following a prior transmission by the intermediate network node of a second request to said server with a view to receiving said subset from the server and responding to each first request coming from the viewing equipment.

Thus the latency time for changing from one representation to another, of the same version or of two different versions, is reduced, since the intermediate network node responds to the request from the viewing equipment instead of the server and since this intermediate network node is closer to the viewing equipment.

According to one embodiment, the description of each representation is stored by the server in the form of a manifest file comprising, for each representation, a field indicating the point of view corresponding to a representation, said file being shared with the intermediate network node and/or the viewing equipment.

According to one embodiment, the viewing equipment obtains information representing its reception bitrate and, when the server stores a plurality of representations for each version, the selected representation is determined from representations of the version corresponding to said point of view having a bitrate less than or equal to the reception bitrate.

According to one embodiment, the subset of representations, referred to as the global subset, comprises the selected representation and a subset of representations, referred to as the supplementary subset, comprising at least one representation determined according to a predefined criterion.

According to one embodiment, the supplementary subset comprises representations of versions corresponding to points of view that are close according to a proximity criterion predefined from the point of view of the user.

According to one embodiment, the viewing equipment obtains information representing a speed of change of point of view of the user, and, when the server stores a plurality of representations for each version, each representation of the global subset is determined by taking into account the speed of change of the point of view of the user.

According to one embodiment, when the server stores a plurality of representations for each version, the manifest file further comprises, for each representation, a field representing a maximum speed of change of point of view beyond which it is considered that the user no longer perceives a gain in quality afforded by one representation compared with a representation having a lower bitrate, and each representation of the global subset is determined so that a value of said field is greater than the speed of change of point of view of the user.

According to one embodiment, when the server stores a plurality of representations for each version, a maximum bitrate is obtained from a table giving, for each speed of change of point of view from a plurality of speeds of change of point of view, a maximum bitrate beyond which the user no longer perceives any gain in quality, each representation of the global subset is determined so that a bitrate of each representation is less than or equal to said maximum bitrate.

According to one embodiment, the global subset is determined by the intermediate network node or by the viewing equipment.

According to one embodiment, the viewing equipment obtains the description of a point of view of the user, referred to as the current point of view, and information representing a speed of change of point of view of the user during a viewing of a current group of images, and determines a representation of a version to be received for a group of images following the current group of images from a point of view, referred to as the anticipated point of view, determined from the current point of view and from said speed of change of point of view.

According to one embodiment, the intermediate network node is a residential gateway or a multiplexer for access to a digital subscriber line.

According to a second aspect of the invention, the invention relates to a method for communicating an immersive video between a server and viewing equipment connected together by a communication link comprising an intermediate network node, said immersive video being stored on the server in the form of a plurality of versions, each version corresponds to a different point of view on the immersive video and the set of versions covers a set of possible points of view on the immersive video, each version has maximum quality in a region of the immersive video corresponding to the field of view of a user viewing the immersive video according to said point of view, and quality inferior to the maximum quality outside said region, the server storing at least one representation for each version in the form of a compressed binary video stream comprising a series of groups of images of predefined duration decodable independently, each representation of the same version having a different bitrate. The method is executed at predetermined regular intervals or following a change of point of view of the user and comprises: receiving a first request from the viewing equipment in which the viewing equipment asks to receive a representation corresponding to a point of view of the user on the immersive video, referred to as the selected representation, determined from a description of each representation and from information representing the point of view of the user; transmitting the selected representation in response to the first request, the intermediate network node continuously receiving at least one subset of the representations of the immersive video following a prior transmission by the intermediate network node of a second request to said server with a view to receiving said subset from the server and responding to each first request coming from the viewing equipment.

According to a third aspect of the invention, the invention relates to equipment for viewing an immersive video connected to a server by a communication link comprising an intermediate network node, said immersive video being stored on the server in the form of a plurality of versions, each version corresponds to a different point of view on the immersive video and the set of versions covers a set of possible points of view on the immersive video, each version has maximum quality in a region of the immersive video corresponding to the field of view of a user viewing the immersive video according to said point of view, and quality inferior to the maximum quality outside said region, the server storing at least one representation for each version in the form of a compressed binary video stream comprising a series of groups of images of predefined duration decodable independently, each representation of the same version having a different bitrate. The viewing equipment comprises: obtaining means for obtaining a description of a point of view of the user; transmission means for transmitting in the direction of the server a first request with a view to receiving a representation corresponding to said point of view, referred to as the selected representation, determined from a description of each representation and from the description of the point of view of the user; reception means for receiving the selected representation from the intermediate network node in response to the first request, the intermediate network node continuously receiving at least one subset of the representations of the immersive video following a prior transmission by the intermediate network node of a second request to said server with a view to receiving said subset from the server and responding to each first request coming from the viewing equipment.

According to a fourth aspect of the invention, the invention relates to an intermediate network node situated on a communication link connecting a server to equipment for viewing immersive videos, an immersive video being stored on the server in the form of a plurality of versions, each version corresponds to a different point of view on the immersive video and the set of versions covers a set of possible points of view on the immersive video, each version has maximum quality in a region of the immersive video corresponding to the field of view of a user viewing the immersive video according to said point of view, and quality inferior to the maximum quality outside said region, the server storing at least one representation for each version in the form of a compressed binary video stream comprising a series of groups of images of predefined duration decodable independently, each representation of the same version having a different bitrate. The intermediate network node comprises: reception means for receiving a first request from the viewing equipment in which the viewing equipment asks to receive a representation corresponding to a point of view of the user on the immersive video, referred to as the selected representation, determined from a description of each representation and from information representing the point of view of the user; transmission means for transmitting the selected representation in response to the first request, the intermediate network node continuously receiving at least one subset of representations of the immersive video following a prior transmission by the intermediate network node of a second request to said server with a view to receiving said subset from the server and responding to each first request coming from the viewing equipment.

According to a fifth aspect of the invention, the invention relates to a system for communicating an immersive video, comprising viewing equipment according to the third aspect and an intermediate network node according to the fourth aspect.

According to a sixth aspect, the invention relates to a computer program, comprising instructions for the implementation, by a device, of the method according to the first aspect or the method according to the second aspect, when said program is executed by a processor of said device.

According to a seventh aspect of the invention, the invention relates to storage means storing a computer program comprising instructions for the implementation, by a device, of the method according to the first aspect or the method according to the second aspect, when said program is executed by a processor of said device.

The features of the invention mentioned above, as well as others, will emerge more clearly from a reading of the following description of an example embodiment, said description being given in relation to the accompanying drawings, among which:

Hereinafter, the invention is described in the context of a user using viewing equipment such as immersive glasses comprising a processing module. The invention is however suited to other viewing equipment such as viewing equipment comprising a room dedicated to the broadcasting of immersive videos equipped with a 360 degree screen or a screen in the form of a dome and a plurality of image projection devices each projecting a point of view of an immersive video. Each image projection device is then connected to an external processing module. In this case, means connected to the external processing module make it possible to determine the point of view on the immersive video of each user present in the room. Moreover, the invention is suited to a context in which there are a plurality of users each having potentially different points of view.

Figure 3:
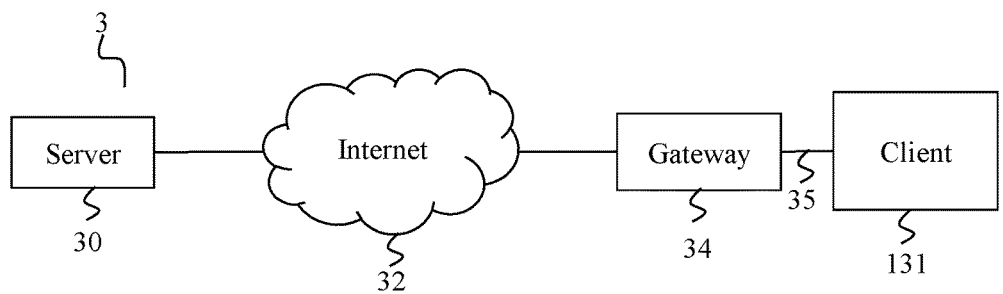
FIG. 3 illustrates schematically a system in which the invention is implemented.

FIG. 3 illustrates schematically a system 3 in which the invention is implemented.

The system 3 comprises a server 30 connected by a network such as an internet network 32 to a residential gateway 34, simply referred to as a gateway hereinafter, situated for example in a dwelling. The gateway 34 makes it possible to connect a local network 35 (LAN: local area network) to the network 32. The local network 35 is for example a wireless network such as a Wi-Fi network (ISO/IEC 8802-11) and/or a cable network such as an Ethernet network (ISO/IEC 8802-3). A processing module 131, referred to as a client hereinafter, is included in a pair of immersive glasses and connected to the local network 35.

Figure 1:
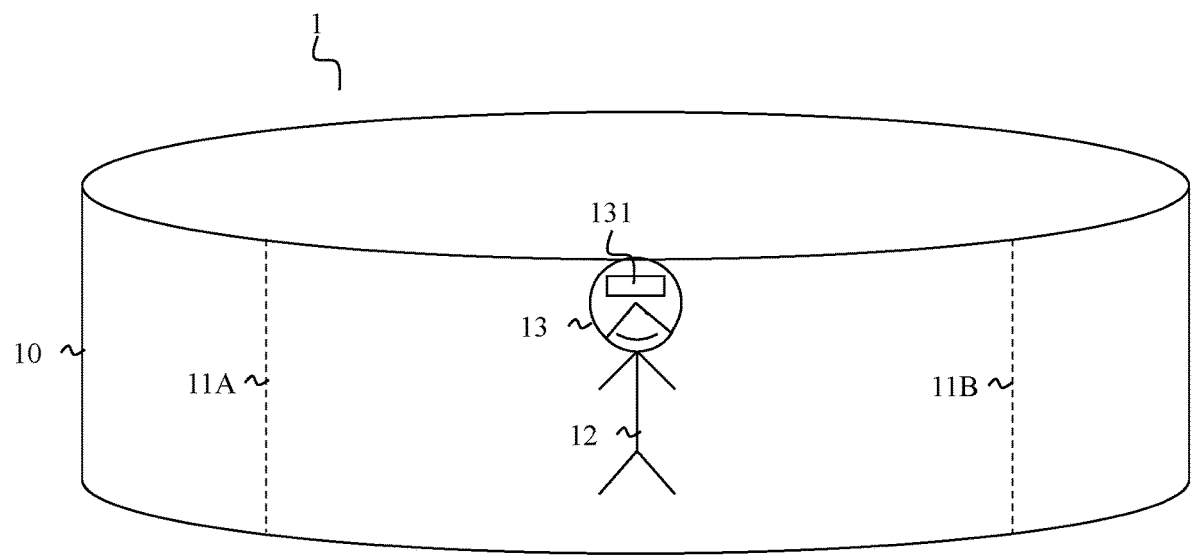
FIG. 1 illustrates schematically an example of a system for broadcasting immersive videos.
Figure 2:
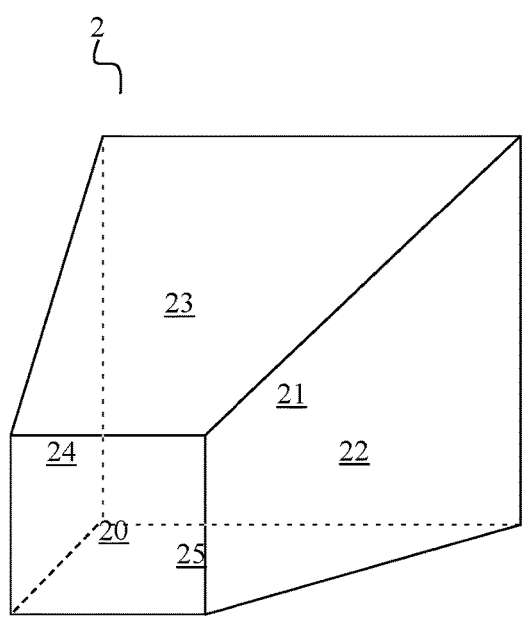
FIG. 2 illustrates schematically a 3D geometric shape 2 to which an immersive video can be applied.

The server 30 stores a plurality of versions of an immersive video. Each version corresponds to a different point of view on the immersive video and the set of versions covers all the possible points of view on the video. Each version is optimised for the point of view to which it corresponds. For example, each version has maximum quality in a region of the immersive video corresponding to the field of view of a user viewing the immersive video according to said point of view, and quality decreasing gradually outside said region according to a distance to limits of said field of view. In one embodiment, the server stores thirty versions of the immersive video. In one embodiment, each version of the immersive video is intended to be applied to the 3D geometric shape described in relation to FIG. 2. The part of the immersive video in the field of view of the user therefore has a high predetermined resolution and a low predetermined compression rate, and the parts outside the field of view of the user have a resolution inferior to the predetermined resolution and a compression rate superior to the predetermined compression rate and decreasing according to the distance to the limits of the field of view of the user until there is respectively a minimum resolution and a maximum compression rate.

The server 30 stores at least one representation for each version. A representation is a binary video stream compressed according to a video compression standard such as the video compression standard H.264/MPEG-4 AVC (Advanced Video Coding) or H.265/MPEG-4 HEVC (High Efficiency Video Coding). When the server 30 stores a plurality of representations of a version, each representation has a different bitrate, i.e. each representation is compressed to a greater or lesser degree. In one embodiment, the server 30 stores five representations per version, which makes a total of 150 representations stored by the server 30.

Each representation is divided into groups of images (Groups of Pictures—GOP) decodable independently and with a predefined duration D. In this way, it is possible to pass from one representation to another at the GOP limit. In one embodiment, the duration D is fixed and goes from 20 ms to 1 s.

The server has a description of each representation of the immersive video that it stores. A known means of describing a plurality of representations of the same multimedia document is using a media presentation description (MPD) file as described by the standard MPEG-DASH (ISO/IEC 23009-1). However, MPD files are suitable for describing a video in terms of video compression standard (AVC, HEVC, etc.), bitrate, and spatial and temporal resolution, but not for describing aspects specific to a point of view on an immersive video. In one embodiment, all the representations of the same immersive video stored by the server 30 are described in a manifest file of the MPD file comprising, for each representation of the fields representing the video compression standard used, the bitrate, the spatial and temporal resolutions and supplementary fields representing an azimuth, an angle of elevation and optionally a roll angle.

Another known means of describing a plurality of representations of the same multimedia document is using a playlist file as described by the HLS standard. However, playlist files are suitable for describing a video in terms of video compression standard, bitrate and spatial and temporal resolution, but not for describing aspects specific to a point of view on an immersive video. In one embodiment, all the representations of the same immersive video stored by the server 30 are described in a manifest file of the playlist type comprising, for each representation of the files representing the video compression standard used, the bitrate, the spatial and temporal resolutions and supplementary fields representing an azimuth, an angle of elevation and optionally a roll angle.

The server 30 is suitable for broadcasting the immersive video to a plurality of clients simultaneously, each client receiving a representation suited to its point of view and each client viewing the same instant of the video.

Each representation of the immersive video is broadcast over a multicast group to which a receiving device can subscribe. A representation is actually transmitted over the network only when at least one receiving device subscribes to the multicast group corresponding to this representation.

In addition, it is known that data transmitted over a network of the internet type are transmitted in the form of packets and that, in order to reach their destination, these packets pass through routers that are responsible for directing these packets to their destination. When a plurality of receiving devices situated on two different branches of the network subscribe to the same multicast group transmitted by the same sending device, the sending device transmits the packets corresponding to said multicast group only once. The last multicast router in common between the two receiving devices is then responsible for duplicating the packet so that each receiving device can receive the packets corresponding to the multicast group to which it subscribes, which makes it possible not to flood the common route between the two receiving devices with redundant packets.

Figure 4A:
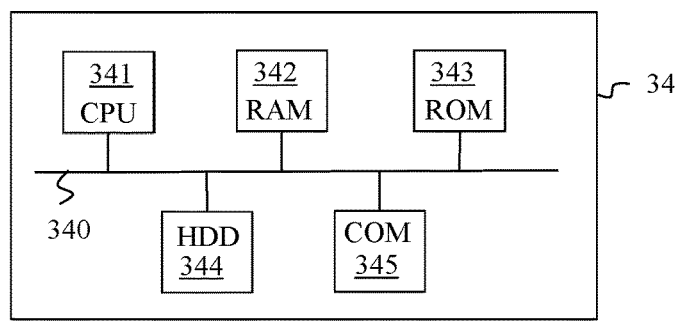
FIG. 4A illustrates schematically an example of hardware architecture of a residential gateway according to the invention.

FIG. 4A illustrates schematically an example of hardware architecture of the gateway 34. The gateway 34 then comprises, connected by a communication bus 340: a processor or CPU (central processing unit) 341; a random access memory RAM 342; a read only memory ROM 343; a storage unit or a storage medium reader, such as an SD (Secure Digital) card reader 344; a set of communication interfaces 345 for connecting the gateway 34 to the server 30 through the network 32 and to the client 131 through the local network 35.

The processor 341 is capable of executing instructions loaded into the RAM 342 from the ROM 343, from an external memory (not shown), from a storage medium such as an SD card, or from a communication network. When the gateway 34 is powered up, the processor 341 is capable of reading instructions from the RAM 342 and executing them. These instructions form a computer program causing the implementation, by the processor 341, of a part, relating to the gateway 34, of the methods described in relation to FIGS. 5A and 5B.

Figure 4B:
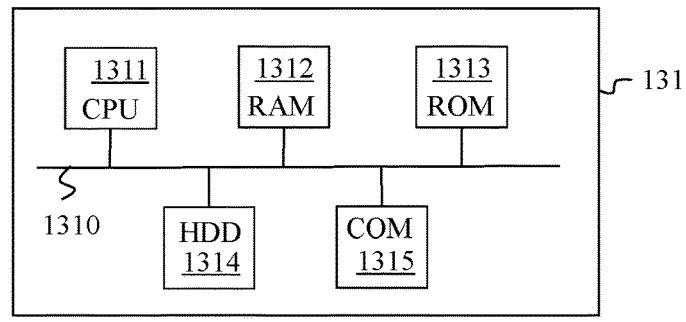
FIG. 4B illustrates schematically an example of hardware architecture of a client according to the invention.

FIG. 4B illustrates schematically an example of hardware architecture of the client 131. The client 131 then comprises, connected by a communication bus 1310: a processor or CPU (central processing unit) 1311; a random access memory RAM 1312; a read only memory ROM 1313; a storage unit or a storage medium reader, such as an SD (Secure Digital) card reader 1314; a set of communication interfaces 1315 for connecting the client 131 to the gateway 34 through the local network 35.

The processor 1311 is capable of executing instructions loaded in the RAM 1312 from the ROM 1313, from an external memory (not shown), from a storage medium, such as an SD card, or from a communication network. When the gateway 1314 is powered up, the processor 1311 is capable of reading instructions from the RAM 1312 and executing them. These instructions form a computer program causing the implementation, by the processor 1311, of a part, relating to the client 131, of the method described in relation to FIG. 5B.

Figure 4C:
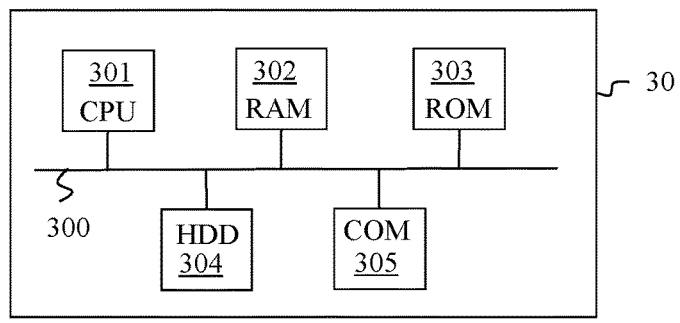
FIG. 4C illustrates schematically an example of hardware architecture of a server according to the invention.

FIG. 4C illustrates schematically an example of hardware architecture of the server 30. The server 30 then comprises, connected by a communication bus 300: a processor or CPU (central processing unit) 301; a random access memory RAM 302; a read only memory ROM 303; a storage unit or a storage medium reader, such as an SD (Secure Digital) card reader 304; a set of communication interfaces 305 for connecting the server 30 to the gateway 34 through the local network 32.

The processor 301 is capable of executing instructions loaded in the RAM 302 from the ROM 303, from an external memory (not shown), from a storage medium, such as an SD card, or from a communication network. When the gateway 304 is powered up, the processor 301 is capable of reading instructions from the RAM 302 and executing them. These instructions form a computer program causing the implementation, by the processor 301, of a part, relating to the server 30, of the method described in relation to FIG. 5A.

Figure 5A:
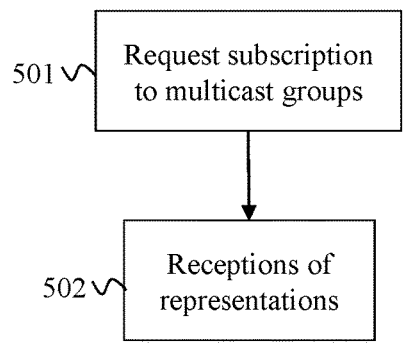
FIG. 5A illustrates schematically a method for subscribing to a plurality of multicast groups each corresponding to a representation of an immersive video.
Figure 5B:
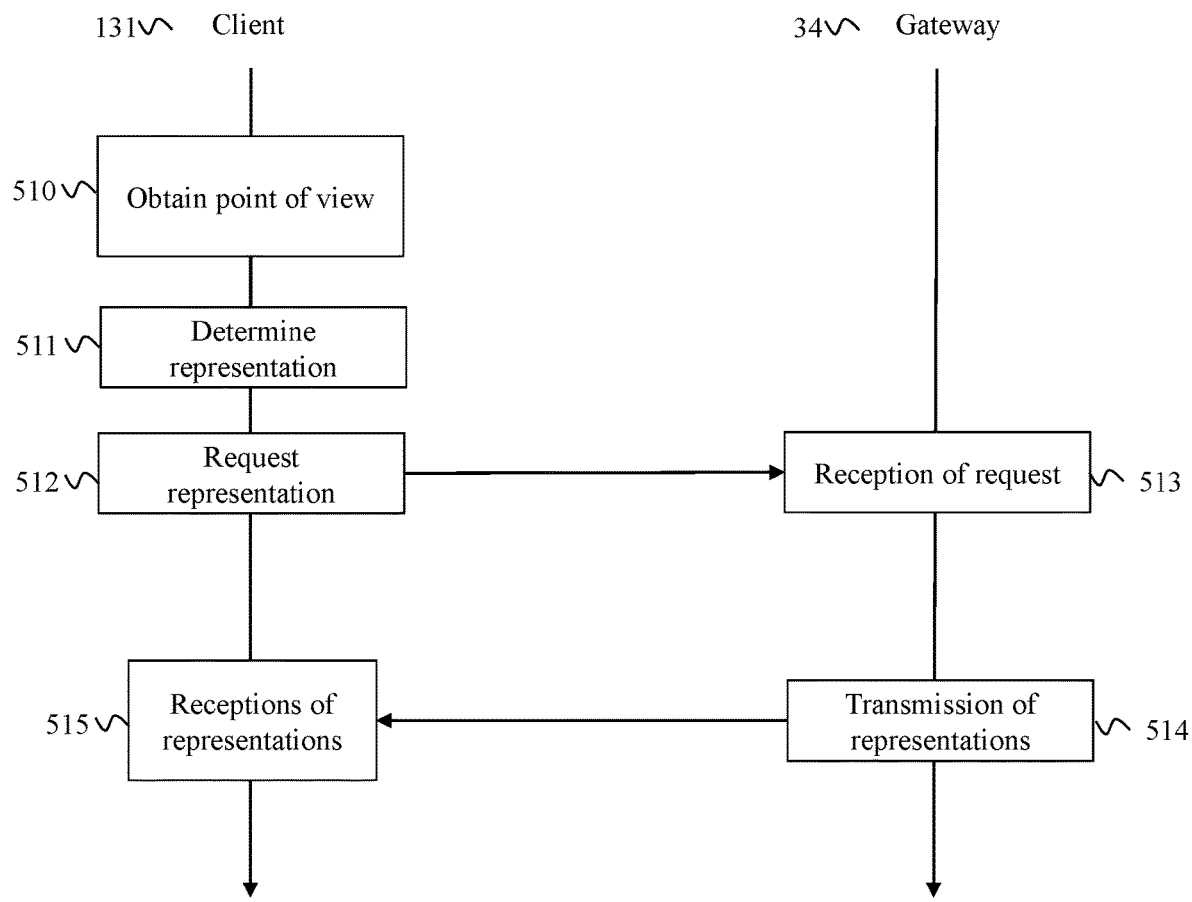
FIG. 5B illustrates schematically a method for broadcasting an immersive video.

All or some of the methods described in relation to FIGS. 5A and 5B can be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit).

FIG. 5A illustrates schematically a method for subscribing to a plurality of multicast groups each corresponding to a representation of an immersive video.

As seen above, if the client 131 were to address the server 30 directly in order to obtain a new representation of the immersive video when there is a change of point of view of the user, the latency time underlying the recovery of the representation corresponding to the new point of view would cause a temporary degradation in the rendition of the immersive video. In order to overcome this problem in the context of the invention, the client 131 obtains each representation not from the server 30 but from an intermediate node in the network, closer to the client 131, which reduces the latency time. However, for an intermediate node of the network to be able to supply a representation requested by the client 131, it is necessary for this node to possess this representation. In the embodiment in FIG. 5A, the gateway 34 fulfils a role of intermediate node. In other embodiments, this role of intermediate node could be fulfilled by other nodes in the network such as a DSLAM (digital subscriber line access multiplexer).

In a step 501, the gateway 34 transmits a request to the server 30 with a view to receiving each representation of the immersive video stored by the server 30. It is assumed here that the gateway 34 has previously received, from the server 30, the manifest file describing all the representations of the immersive video. In one embodiment, when the client 131 is activated, it requests the manifest file from the server 30. In return, the server 30 transmits the manifest file to the client 131. When passing through the gateway 34, the manifest file is saved by the gateway 34, which enables the latter to use it to request the transmission of each representation. In the embodiment of the invention where each representation is transmitted over a multicast group, during step 501 the gateway 34 subscribes to each multicast group corresponding to a representation of the immersive video. If no node in the network (i.e. no intermediate node, no client) had previously requested the transmission of the representations, the server 30 commences the actual transmission of data packets transporting each representation to the gateway 34. Otherwise, if the representations were in the course of transmission to at least one other node in the network, the last multicast router in common between the gateway 34 and at least one of said other nodes in the network duplicates the data packets transporting each representation so that they are routed to the gateway 34.

In a step 502, the gateway 34 receives each representation of the immersive video. In this way the gateway 34 continuously receives each representation of the immersive video. The gateway 34 stores in memory the packets corresponding to each representation for a predefined time T and then deletes them. In one embodiment, the time T is equal to one second.

FIG. 5B illustrates schematically a method for broadcasting an immersive video.

It is assumed that the user has powered up his immersive glasses and therefore that the client 131 is activated. The client 131 has therefore received the manifest file. Moreover, the active glasses comprise a positioning module, not described, capable of providing a description of the point of view of the user. For example, this positioning module provides an azimuth and an angle of elevation. In one embodiment, the positioning module also supplies information representing a speed of change of the point of view. For example, when the user is wearing immersive glasses, the speed of change of point of view is a speed of rotation of the head of the user. In other embodiments, the point of view on the immersive video (and therefore the changes in points of view) can be controlled by a remote control, a pointer, a glove or any other suitable interface. Each of these interfaces is able to supply information representing a speed of change of the point of view to the positioning module.

In FIG. 5B, the vertical arrows represent a time axis.

The method described in relation to FIG. 5B is implemented at predetermined regular intervals, for example every 20 ms, so as to quickly take into account each change in point of view of the user or following a change in point of view of the user.

In a step 510, the client 131 obtains a description of the point of view of the user.

In a step 511, the client 131 determines, from said description and from the manifest file, a representation of a version of the immersive video corresponding to said point of view. For example, from the azimuth and the elevation angle, the client determines a straight line and determines which version corresponds to a point of view through which this straight line passes. The version through which the straight line passes is the version determined. In the embodiment where the server stores a single representation for each version, the client chooses the representation of the version determined. In the embodiment where the server stores a plurality of representations for each version, the client chooses a representation of the version determined according to the quality of its connection to the network.

In a step 512, the client 131 transmits a request to the gateway 34 with a view to receiving the representation determined.

In a step 513, the gateway 34 receives said request.

In a step 514, the gateway 34 transmits the representation determined to the client 131.

In a step 515, the client 131 receives the representation determined from the gateway 34, decodes it and views it on the image viewing device integrated in the immersive glasses. Since the client 131 has addressed the gateway 34 rather than the server 30 in order to obtain a representation of the version corresponding to the point of view of the user, the latency time for obtaining this representation is shortened and the user almost instantaneously passes from one representation of the immersive video to another.

It is found that, in the method described in relation to FIG. 5B, the gateway 34 responds to each request coming from the viewing equipment with a view to receiving a representation corresponding to a point of view of the user.

In the embodiment where the server 30 stores a plurality of representations for each version (i.e. for each point of view), the client 131 measures its reception bitrate by applying known techniques. For example, the client measures the reception bitrate on a GOP preceding the GOP in the course of reception. In this case, in addition to requesting a representation corresponding to the point of view of the user, the client 131 requests of the gateway 34 a representation corresponding to its reception bitrate. To do this, the client 131 selects, in step 511, in the manifest file, a representation corresponding to the point of view of the user the bitrate of which is less than or equal to its reception bitrate.

In one embodiment, in step 512, the client 131 transmits a request with a view to receiving the representation determined to the server 30. However, in step 513, the gateway 34 recognises this request and intercepts it. Thus the gateway 34 prevents the request from reaching the server 30 since it will itself respond to this request in place of the server 30. Steps 514 and 515 remain identical. In this way, the client 131 has no need to know that the gateway 34 implements the invention.

In one embodiment, the client 131 transmits the description of the point of view of the user to the gateway 34 in a request with a view to receiving a representation corresponding to said description in step 512. In this case, the gateway 34 executes step 511 instead of the client 131 following step 513 in order to determine, from the manifest file, the representation corresponding to said description.

In a particular embodiment, following the reception of a request with a view to receiving a representation of the immersive video corresponding to a point of view, the gateway 34 re-implements the method described in relation to FIG. 5A but subscribes only to a subset of the multicast groups. In one embodiment, this subset of multicast groups, referred to as the global subset, is determined by the gateway 34. This subset comprises in all cases the multicast group making it possible to obtain the representation corresponding to the point of view of the user, referred to as the base multicast group, and a subset of multicast groups comprising at least one multicast group corresponding to a representation selected according to a predefined criterion, referred to as the supplementary subset. The gateway 34 unsubscribes from all the multicast groups not belonging to the global subset. This embodiment makes it possible to reduce the bitrate between the server 30 and the gateway 34.

In this particular embodiment, when a plurality of clients are displaying the same immersive video at the same time, the gateway 34 subscribes to the union of the global subsets determined for each client.

In one embodiment, the supplementary subset comprises multicast groups enabling the gateway 34 to obtain representations corresponding to points of view that are close in accordance with a predefined proximity criterion of the point of view of the user.

In one embodiment, during step 512, the client 131 transmits to the gateway 34 a description of the point of view of the user. For example, the client 131 transmits to the gateway 34 a value representing an azimuth $a_c$ and a value representing an elevation $e_c$. If the manifest file comprises thirty representations described by their azimuth $A_i$ and their elevation $E_i$, i being an integer lying between 0 and 29, the gateway 34 sorts the representations according to a separation A of the point of view to which each corresponds with respect to the point of view of the user. Said separation A can for example be calculated as follows:

$$A=(\cos(A_i)\cos(E_i)-\cos(a_c)\cos(e_c))^2+(\cos(A_i)\sin(E_i)-\cos(a_c)\sin(e_c))^2+(\sin(E_i)-\sin(e_c))^2$$

The representations are classified by the gateway 34 in a list by increasing order of separations Δ. The supplementary subset comprises, for example, multicast groups making it possible to obtain the first N representations in the list. By selecting these multicast groups, the gateway 34 selects points of view on the immersive video, referred to selected points of view, close to the point of view of the user. In one embodiment N=10.

In one embodiment, in step 512, the client 131 transmits to the gateway 34 a description of the point of view of the user and information representing the reception bitrate of the client 131. The supplementary subset then comprises solely multicast groups making it possible to obtain representations corresponding to the selected points of view and the bitrate of which is less than or equal to the reception bitrate of the client 131.

In another embodiment, in step 512, the client 131 transmits to the gateway 34 a request for a representation of a version corresponding to a point of view. The gateway 34 determines the azimuth $a_c$ and the elevation $e_c$ of the point of view of the user as being the azimuth and elevation of the version requested by the client. Thus the client 131 does not need to be adapted to use a gateway that implements this embodiment.

It is known that, when a user moves his head quickly, he is insensitive to the quality of the immersive video that he is viewing. It is then possible for the gateway 34 to take into account a rotation speed of the head of the user when determining the supplementary subset. Thus, if the rotation of the head of the user is rapid, the gateway 34 subscribes to multicast groups making it possible to obtain representations corresponding to the selected points of view of low quality, i.e. where the bitrate is low (or even where the quality is the lowest possible, i.e. where the bitrate is minimum), whereas, if the rotation of the head is slow, the gateway 34 subscribes to multicast groups making it possible to obtain representations corresponding to the selected points of view where the bitrate is as close as possible by lower value to the reception bitrate of the client 131. Thus, when the movement is rapid, the supplementary subset may contain a larger number of points of view in order best to adapt to the direction of the point of view of the user without increasing the data rate in the global network.

In one embodiment, the manifest file comprises, for each representation of the immersive video, a field, referred to as the SPEED field, comprising a value representing a maximum rotation speed beyond which it is considered that the user no longer perceives any gain in quality afforded by a representation compared with a representation having a lower bitrate. In this embodiment, in step 512, the client 131 transmits to the gateway 34 a description of the point of view of the client 131, information representing the reception bitrate of the client 131 and information representing a rotation speed of the head of the user. The supplementary subset then comprises solely multicast groups making it possible to obtain representations corresponding to the selected points of view where the bitrate is less than or equal to the reception bitrate of the client 131 and where the value of the field SPEED is greater than the speed of movement of the head of the user.

In one embodiment, the gateway 34 has in memory a lookup table giving, for each rotation speed in a plurality of rotation speeds, a maximum bitrate beyond which the user no longer perceives any gain in quality. In this embodiment, in step 512, the client 131 transmits to the gateway 34 a description of the point of view of the client 131, information representing the bitrate of the client 131 and information representing a rotation speed of the head of the user. The supplementary subset then comprises solely multicast groups making it possible to obtain representations corresponding to the selected points of view where the bitrate is less than or equal to the reception bitrate of the client 131 and less than or equal to the maximum bitrate determined from the rotation speed of the head of the client and from the lookup table.

Up until now, we have considered that the global subset was determined by the gateway 34. The client 131 has all the information necessary for determining the global subset (manifest file, description of the point of view of the user, reception bitrate of the client 131, rotation speed of the head of the client, lookup table). The client 131 is therefore capable of determining the global subset by applying the same methods as the gateway 34. In one embodiment, it is the client 131 that determines the global subset instead of the gateway 34 in step 511. In step 512, the client 131 transmits to the gateway 34 information representing the global subset. In step 501, the gateway 34 subscribes to the multicast groups that were indicated to it by the client 131.

From the description of the point of view of the user and the rotation speed of the head of the user, it is possible to determine the point of view that the user will be looking at at a given instant. In one embodiment, when the client 131 begins to display a GOP, it obtains a description of the point of view of the client 131 and information representing a rotation speed of the head of the user. From this information, the client 131 determines a description of its point of view at the start of the next GOP, referred to as the anticipated point of view. In step 511, from the description of the anticipated point of view and the manifest file, the client 131 determines a representation of a version of the immersive video corresponding to said anticipated point of view and transmits a request to the gateway 34 with a view to receiving the representation determined in step 512. In this way, the next GOP corresponds to the anticipated point of view.

The invention claimed is:

1. A method for communicating an immersive video between a server and viewing equipment connected together by a communication link comprising an intermediate network node said immersive video being stored on the server in the form of a plurality of versions, each version corresponds to a different point of view on the immersive video and the set of versions covers a set of possible points of view on the immersive video, each version has maximum quality in a region of the immersive video corresponding to the field of view of a user viewing the immersive video from said point of view, and a quality inferior to the maximum quality outside said region, the server storing at least one representation for each version in the form of a compressed binary video stream comprising a series of groups of images of predefined duration decodable independently, each representation of the same version having a different bitrate, wherein the method is executed at predetermined regular intervals or following a change of point of view of the user and comprises:

obtaining a description of a point of view of the user;

transmitting, in the direction of the server, a first request with a view to receiving a representation corresponding to said point of view, referred to as the selected representation, determined from a description of each representation and from the description of the point of view of the user; and receiving, from the intermediate network node, the representation selected in response to the first request, the intermediate network node continuously receiving at least one subset of representations of the immersive video following a prior transmission by the intermediate network node of a second request to said server with a view to receiving said subset from the server and responding to each first request coming from the viewing equipment.

2. The method according to claim 1, wherein the description of each representation is stored by the server in the form of a manifest file comprising, for each representation, a field indicating the point of view corresponding to a representation, said file being shared with the intermediate network node and/or the viewing equipment.

3. The method according to claim 2, wherein the viewing equipment obtains information representing its reception bitrate and, when the server stores a plurality of representations for each version, the selected representation is determined from representations of the version corresponding to said point of view having a bitrate less than or equal to the reception bitrate.

4. The method according to claim 2 or claim 3, wherein the subset of representations, referred to as the global subset, comprises the selected representation and a subset of representations, referred to as the supplementary subset, comprising at least one representation determined according to a predefined criterion.

5. The method according to claim 4, wherein the supplementary subset comprises representations of versions corresponding to points of view that are close according to a proximity criterion predefined from the point of view of the user.

6. The method according to claim 4, wherein the viewing equipment obtains information representing a speed of change of point of view of the user, and, when the server stores a plurality of representations for each version, each representation of the global subset is determined by taking into account the speed of change of the point of view of the user.

7. The method according to claim 2, wherein, when the server stores a plurality of representations for each version, the manifest file further comprises, for each representation, a field representing a maximum speed of change of point of view beyond which it is considered that the user no longer perceives a gain in quality afforded by one representation compared with a representation having a lower bitrate, and each representation of the global subset is determined so that a value of said field is greater than the speed of change of point of view of the user.

8. The method according to claim 2, wherein, when the server stores a plurality of representations for each version, a maximum bitrate is obtained from a table giving, for each speed of change of point of view from a plurality of speeds of change of point of view, a maximum bitrate beyond which the user no longer perceives any gain in quality, each representation of the global subset is determined so that a bitrate of each representation is less than or equal to said maximum bitrate.

9. The method according to claim 4, wherein the global subset is determined by the intermediate network node or by the viewing equipment.

10. The method according to claim 1, wherein the viewing equipment obtains the description of a point of view of the user, referred to as the current point of view, and information representing a speed of change of point of view of the user during a viewing of a current group of images, and determines a representation of a version to be received for a group of images following the current group of images from a point of view, referred to as the anticipated point of view, determined from the current point of view and from said speed of change of point of view.

11. The method according to claim 1, wherein the intermediate network node is a residential gateway or a multiplexer for access to a digital subscriber line.

12. A method for communicating an immersive video between a server and viewing equipment connected together by a communication link comprising an intermediate network node, said immersive video being stored on the server in the form of a plurality of versions, each version corresponds to a different point of view on the immersive video and the set of versions covers a set of possible points of view on the immersive video, each version has maximum quality in a region of the immersive video corresponding to the field of view of a user viewing the immersive video according to said point of view, and quality inferior to the maximum quality outside said region, the server storing at least one representation for each version in the form of a compressed binary video stream comprising a series of groups of images of predefined duration decodable independently, each representation of the same version having a different bitrate, wherein the method is executed at predetermined regular intervals or following a change of point of view of the user and comprises:

receiving a first request from the viewing equipment in which the viewing equipment asks to receive a representation corresponding to a point of view of the user on the immersive video, referred to as the selected representation, determined from a description of each representation and from information representing the point of view of the user; and transmitting the selected representation in response to the first request, the intermediate network node continuously receiving at least one subset of representations of the immersive video following a prior transmission by the intermediate network node of a second request to said server with a view to receiving said subset from the server and responding to each first request coming from the viewing equipment.

13. An equipment for viewing an immersive video connected to a server by a communication link comprising an intermediate network node, said immersive video being stored on the server in the form of a plurality of versions, each version corresponds to a different point of view on the immersive video and the set of versions covers a set of possible points of view on the immersive video, each version has maximum quality in a region of the immersive video corresponding to the field of view of a user viewing the immersive video according to said point of view, and a quality inferior to the maximum quality outside said region, the server storing at least one representation for each version in the form of a compressed binary video stream comprising a series of groups of images of predefined duration decodable independently, each representation of the same version having a different bitrate, wherein the viewing equipment comprises circuitry configured to:

obtain a description of a point of view of the user;

transmit in the direction of the server a first request with a view to receiving a representation corresponding to said point of view, referred to as the selected representation, determined from a description of each representation and from the description of the point of view of the user; and receive the selected representation from the intermediate network node in response to the first request, the intermediate network node continuously receiving at least one subset of representations of the immersive video following a prior transmission by the intermediate network node of a second request to said server with a view to receiving said subset from the server and responding to each first request coming from the viewing equipment.

14. An intermediate network node situated on a communication link connecting a server to equipment for viewing immersive videos, an immersive video being stored on the server in the form of a plurality of versions, each version corresponds to a different point of view on the immersive video and the set of versions covers a set of possible points of view on the immersive video, each version has maximum quality in a region of the immersive video corresponding to the field of view of a user viewing the immersive video according to said point of view, and quality inferior to the maximum quality outside said region, the server storing at least one representation for each version in the form of a compressed binary video stream comprising a series of groups of images of predefined duration decodable independently, each representation of the same version having a different bitrate, wherein the intermediate network node comprises circuitry configured to:

receive a first request from the viewing equipment in which the viewing equipment asks to receive a representation corresponding to a point of view of the user on the immersive video, referred to as the selected representation, determined from a description of each representation and from information representing the point of view of the user; and transmit the selected representation in response to the first request, the intermediate network node continuously receiving at least one subset of representations of the immersive video following a prior transmission by the intermediate network node of a second request to said server with a view to receiving said subset from the server and responding to each first request coming from the viewing equipment.

15. A system for communicating an immersive video, comprising viewing equipment according to claim 13 and an intermediate network situated on a communication link connecting a server to equipment for viewing immersive videos, an immersive video being stored on the server in the form of a plurality of versions, each version corresponds to a different point of view on the immersive video and the set of versions covers a set of possible points of view on the immersive video, each version has maximum quality in a region of the immersive video corresponding to the field of view of a user viewing the immersive video according to said point of view, and quality inferior to the maximum quality outside said region, the server storing at least one representation for each version in the form of a compressed binary video stream comprising a series of groups of images of predefined duration decodable independently, each representation of the same version having a different bitrate, wherein the intermediate network node comprises circuitry configured to:

receive a first request from the viewing equipment in which the viewing equipment asks to receive a representation corresponding to a point of view of the user on the immersive video, referred to as the selected representation, determined from a description of each representation and from information representing the point of view of the user; and transmit the selected representation in response to the first request, the intermediate network node continuously receiving at least one subset of representations of the immersive video following a prior transmission by the intermediate network node of a second request to said server with a view to receiving said subset from the server and responding to each first request coming from the viewing equipment.

16. A non-transitory computer readable medium embodying instructions for the implementation, by a device, of the method according to claim 12, when said instructions are executed by a processor of said device.

17. A non-transistory storage medium storing a computer program comprising instructions for the implementation, by a device of the method according to claim 1, when said program is executed by a processor of said device.

* * * * *